United States Patent
Magistrado et al.

(10) Patent No.: US 10,007,810 B2
(45) Date of Patent: Jun. 26, 2018

(54) ALTERNATE SCREEN REVEAL FOR INSTANT PRIVACY

(71) Applicant: Excalibur IP, LLC, Sunnyvale, CA (US)

(72) Inventors: Vince Magistrado, Redlands, CA (US); Utkarsh Shrivastava, San Jose, CA (US)

(73) Assignee: Excalibur IP, LLC, Sunnyvale, CA (US)

(*) Notice: Subject to any disclaimer, the term of this patent is extended or adjusted under 35 U.S.C. 154(b) by 359 days.

(21) Appl. No.: 14/046,930

(22) Filed: Oct. 5, 2013

(65) Prior Publication Data

US 2015/0100908 A1 Apr. 9, 2015

(51) Int. Cl.
  *G06F 21/84* (2013.01)
  *G06F 3/0484* (2013.01)

(52) U.S. Cl.
  CPC ........... *G06F 21/84* (2013.01); *G06F 3/0484* (2013.01)

(58) Field of Classification Search
  CPC .............................. G06F 21/84; G06F 3/0484
  USPC .................................................. 715/766, 768
  See application file for complete search history.

(56) References Cited

U.S. PATENT DOCUMENTS

| | | | |
|---|---|---|---|
| 7,376,669 B2 * | 5/2008 | Klein | |
| 2006/0242602 A1 * | 10/2006 | Schechter et al. | 715/838 |
| 2010/0275266 A1 * | 10/2010 | Jakobson | G06F 3/14 726/26 |
| 2011/0179366 A1 * | 7/2011 | Chae | G06F 21/84 715/764 |
| 2011/0320274 A1 * | 12/2011 | Patil | 705/14.49 |
| 2014/0113718 A1 * | 4/2014 | Norman | A63F 13/12 463/31 |

OTHER PUBLICATIONS

How to Show Desktop in Mac OS X. (May 29, 2012). Retrieved Aug. 18, 2015, from https://www.youtube.com/watch?v=WbgRLeMH6QM.*
Title: Add a Stealth Mode Boss Button to Google Chrome. Publication Date: Febuary 22, 2010. URL: http://web.archive.org/web/20100222085522/http://www.howtogeek.com/howto/9799/add-a-stealth-mode-boss-button-to-google-chrome.*

* cited by examiner

*Primary Examiner* — Abdullah Al Kawsar
*Assistant Examiner* — David Luu
(74) *Attorney, Agent, or Firm* — Cooper Legal Group, LLC (57) ABSTRACT

A system and method for assuring the privacy of a computer application includes generating a user interface with a privacy feature coupled with a computer application. Through the user interface, the user is able to activate the privacy feature while interacting with the computer application. The computer application displays application-based screen elements against a backdrop. Once activated, the privacy feature presents a visual display hiding the application-based screen elements in the application from view without closing or logging out of the application.

20 Claims, 13 Drawing Sheets

ALTERNATE SCREEN REVEAL FOR INSTANT PRIVACY

CROSS-REFERENCE TO RELATED APPLICATIONS

None.

FIELD OF THE INVENTION

The invention disclosed broadly relates to the field of privacy for computer applications, and more particularly relates to the field of employing an alternate screen reveal for privacy.

BACKGROUND OF THE INVENTION

Today's computers can host a multitude of applications, from e-mail messaging to specialized applications (apps) that can read and interpret an EKG (electrocardiograph). Whether or not these apps are of a sensitive nature, most users do not want to broadcast their computer sessions to the general public. For example, an e-mail session can be very personal and private, with the e-mail participants unwilling to reveal the names, subject, and/or content of e-mail messages, yet many e-mail correspondents today like to catch up on their e-mails while in subways, trains, cafes, and the like. The problem is that these places afford very little privacy. A solution to this is to close or minimize an e-mail session every time someone is nearby. Then, when the passerby leaves, the user must re-open or maximize his screen.

There is a need for a method to ensure application privacy that overcomes the above-stated shortcomings of the known art.

SUMMARY OF THE INVENTION

Briefly, according to an embodiment of the present disclosure, a method for assuring the privacy of a computer application includes: using a processor device operably coupled with a memory to perform computer-executable instructions stored in the memory. The computer-executable instructions include: generating a user interface with a privacy feature in the computer application; receiving a command through the user interface to activate the privacy feature; and activating the privacy feature by presenting a visual display hiding screen elements of the application from view, without closing the application.

The method also includes: receiving another command through the user interface to de-activate the privacy feature. This command restores the hidden screen elements of the computer application to full view. The user interface can include a hotspot or a hotkey. Thus, the user is able to toggle back and forth from privacy mode to full-view mode by clicking the hotspot/hotkey on or off, touching the hotspot, or maneuvering a cursor in/out of the hotspot, to name a few.

The method further includes a timer function that changes the visual display in privacy mode to an alternate visual display when the elapsed time in privacy mode is greater than a pre-determined threshold amount of time. The threshold can be set by the user, or set to a system default.

In another embodiment of the present disclosure, an information processing system for assuring the privacy of a computer application contains hardware elements such as memory and a processor device configured to implement the method steps above. In addition, a computer program product with a computer-readable storage medium can include computer-executable instructions stored thereon for implementing the method for assuring the privacy of a computer application.

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which.

While the invention as claimed can be modified into alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the scope of the present disclosure.

DETAILED DESCRIPTION

Before describing in detail embodiments that are in accordance with the present disclosure, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present disclosure so as not to obscure this description with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

We describe a method and user interface that allows a user engaging with a computer application (app) to invoke a privacy feature to instantly hide potentially sensitive content from passersby without terminating the application. By invoking the novel privacy feature, an app user can quickly hide any screen content with an engaging visual, thus obscuring anything of a potentially sensitive nature. Any passersby that happen to glance at the user's screen see only the visual display, yet the user's application remains open and accessible. Desktop computers, laptops, and mobile devices that run Web applications via a browser will benefit greatly from this novel privacy feature.

The present invention will now be described in more detail with respect to FIGS. 1-13, which are exemplary screenshots, block diagrams, and flowchart illustrations of embodiments of the present disclosure. It will be understood that each block of the flowchart illustrations and/or block diagrams, and combinations of blocks in the flowchart illustrations and/or block diagrams, can be implemented by computer hardware components executing computer program instructions.

Figure 1:
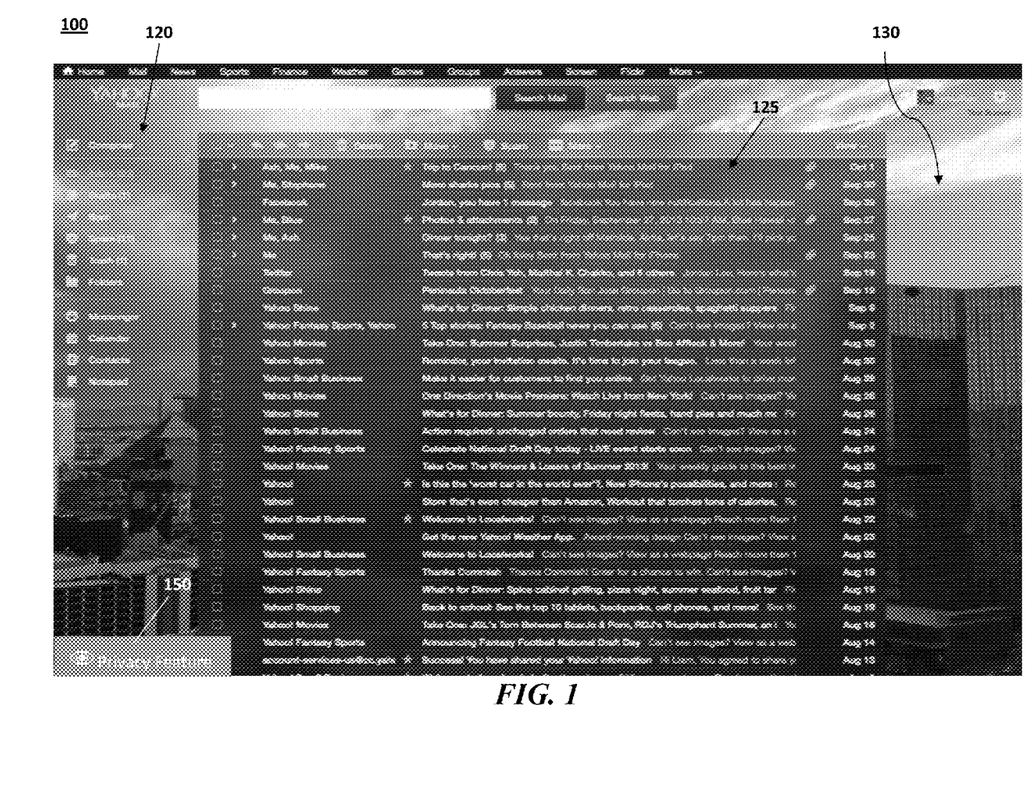
FIG. 1 is an exemplary screenshot of an e-mail screen showing the user interface for activating a privacy feature, according to an embodiment of the present disclosure.
Figure 2:
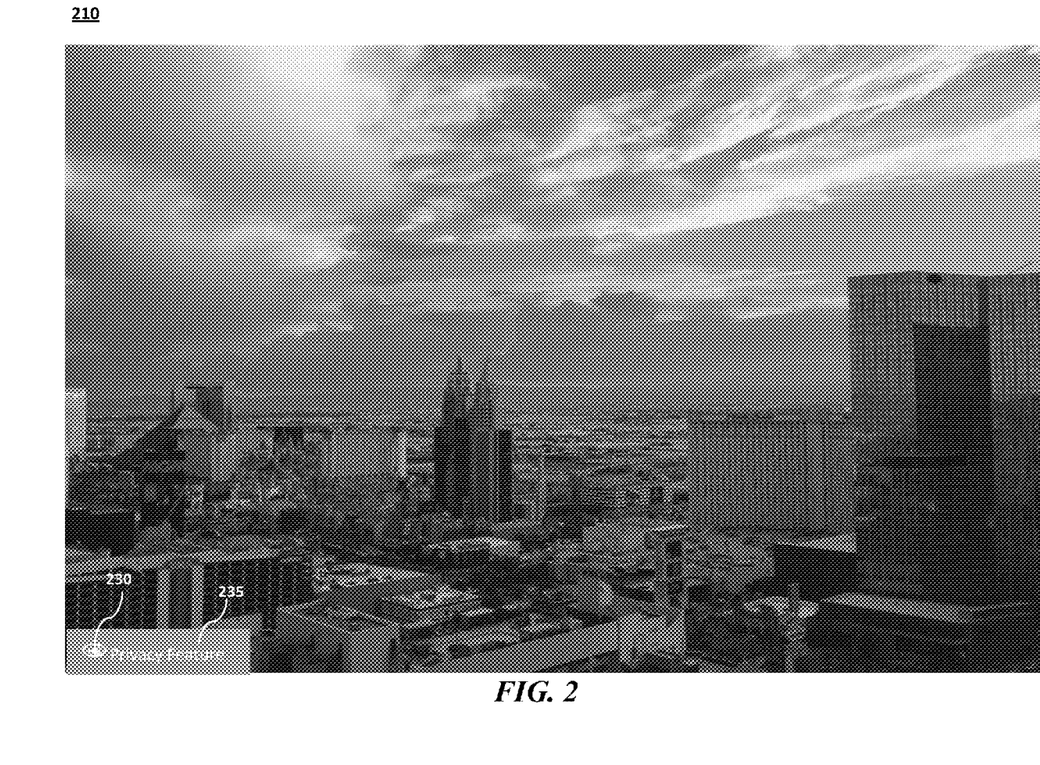
FIG. 2 is an exemplary screenshot of a visual display replacing the e-mail screen of FIG. 1 when the privacy feature is activated, according to an embodiment of the present disclosure.

Referring now in specific detail to the drawings and to FIGS. 1 and 2 in particular, using Yahoo! Mail as an exemplary Web application, we show a user interface (UI) for activating a privacy feature that allows a user to instantly fade out or occult his/her Web app screen from view without having to close out of a session.

In FIG. 1 there is shown an exemplary Web browser-based app 100 featuring an e-mail screen 120 with an e-mail Inbox 125 in active mode. We focus our examples on Web browser-based applications and mobile applications which afford the optimal user experience when implementing the novel privacy feature. The e-mail screen 120 shown in FIG. 1 includes the screen elements such as the Inbox emails 125, and also includes a rich photo backdrop 130. In the lower left-hand corner there is shown a screen hotspot 150 that, when engaged, activates the privacy feature. The hotspot 150 can be engaged in various ways. The user can click within the hotspot 150, or hover over the hotspot 150 with a cursor (or other pointing device). While using the privacy feature with a mobile device such as a cell phone (shown in FIG. 13) the hotspot 150 can be engaged by touch, long touch, performing a gesture over the hotspot, shaking the device, and other mobile-relevant input methods that are known or contemplated.

A screen hotspot is an area on a display screen that is dedicated to a specific GUI (graphical user interface) activity. In this case, the screen hotspot 150 in FIG. 1 acts an interface for triggering the alternate screen 210 to hide an application's on-screen elements from view. De-activating the privacy feature can be prompted by the user moving the pointing device away from the hotspot 150. In this manner the user can easily toggle back and forth between privacy mode (privacy feature=ON) and full-view mode (privacy feature=OFF).

Once activated, the privacy feature, using Web browser features, hides the potentially sensitive visual elements of the application from view, while the backdrop 130 remains visible. There are multiple ways to hide Web-based application screen elements 125 while maintaining the backdrop 130 using Web browser features. Some of these include: 1) placing an overlay over visible elements only, thus making them invisible; or 2) making the visible elements invisible by applying browser styles via Cascading Style Sheets (CSS) settings (opacity:0, or display:none). "Cascading Style Sheets (CSS) is a simple mechanism for adding style (e.g., fonts, colors, spacing) to Web documents." (from the W3C CSS Home Page).

In another embodiment of the present disclosure it is possible to overlay the backdrop 130 as well as the application elements 125 with visual elements (charts, graphs, theme picker, alternate background, ads, and the like). The alternate screen 210 shown in FIG. 2 is triggered natively in the Web application 100 itself, meaning that the user doesn't have to leave the app to invoke the privacy/alternate screen. Instead, the action to invoke the alternate screen/privacy feature (hover, hotkey, click, touch) happens inside the application.

A benefit of this privacy feature is that no additional storage space is required. This is because the application 100 is still active in the background; the alternate display is a "temporary" or "soft" escape from the app, and not destructive. The app still remains active in the background. In other words, when using this feature, the user doesn't have to logout or exit the browser, and then re-login to use the app. No page refresh occurs.

Once activated by either by clicking/hovering over the hotspot 150 or pressing a hotkey, this privacy function hides the screen content with a new visual display, or with the existing backdrop 130, such as the one shown in FIG. 2. A hotkey is a key providing quick access to a specific function; in this case, the hotkey triggers the privacy function. When the user engages the hotspot 150 or selects the hotkey, all on-screen app content 125 disappears, revealing only the visual display 210 served in the UI 150, which in this case is the original backdrop 130. In an embodiment of the present disclosure, the app backdrop 130 is used as the default visual image 210; in other words, the image that will be shown when the user has not made a specific selection.

Referring to FIG. 2, text 235 and/or an icon 230 can be placed in a section of the UI 150 that hosts the image to be used as the visual display 210, along with any content. This text 235 and/or icon 230 can be an attribution link to the image, or an icon, such as the eye icon shown in FIG. 2. It will be apparent to those with knowledge in the art that any icon and/or combination of icon 230 and text 235 can be used and remain within the spirit and scope of the disclosure. The icon 230 and text 235 shown in FIG. 2 are for illustrative purposes only.

In one embodiment of the present disclosure, the user has the option to select and change his/her own images to display as alternate images, such as a company logo, photograph, quotation, artwork, and any other image that may be interesting to the user. To select the image to display, the user can simply upload a graphical image and/or text. The visual display that is selected can also be the same display that serves as the backdrop 130 to the current application.

Figure 13:
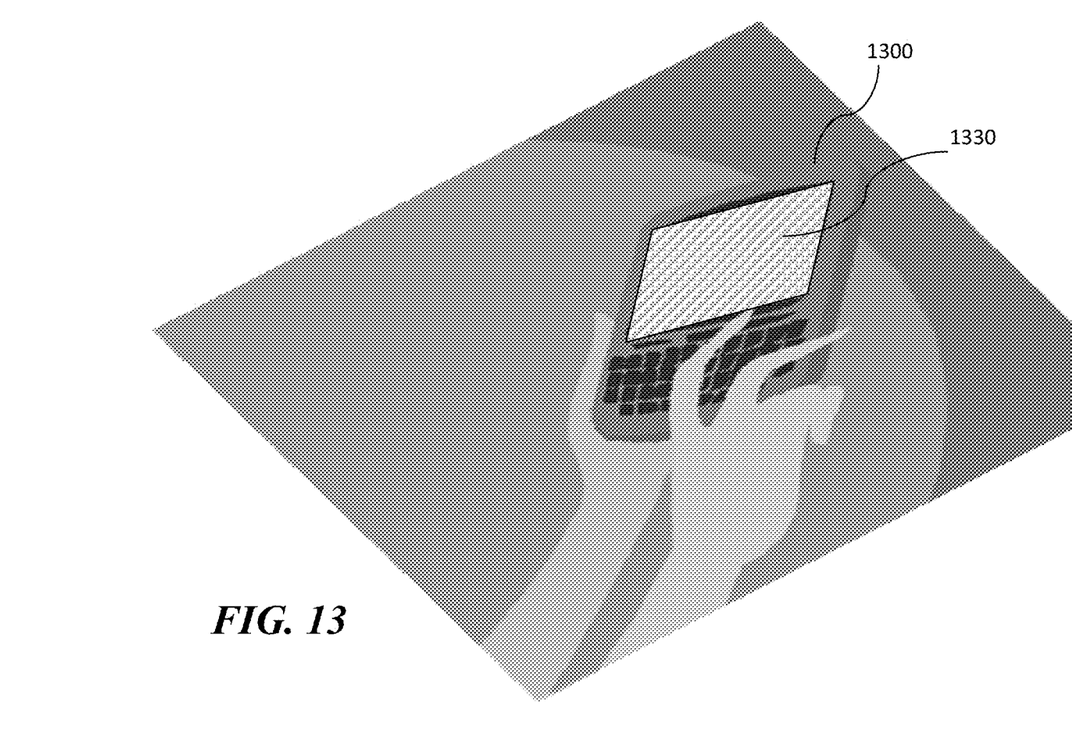
FIG. 13 shows a mobile device on which an embodiment of the present disclosure can be implemented.

Referring now to FIG. 13, there is shown a simplified illustration of a mobile device 1300 running a browser-based application configured to operate according to an embodiment of the present disclosure. The screen shows only the backdrop 1330 of the browser-based application after the user has activated the privacy feature. The application screen elements are hidden from view.

In some embodiments when there is enough screen real estate to serve an image requiring a large area, we can serve an image that covers the entire screen, as well as multiple images at a time. For example, referring to FIG. 5, we can display charts such as the chart 500, if desired. The idea is to provide the user with a means to "escape" the browser app temporarily without closing the session. Escaping the privacy function can be as simple as entering a keystroke or moving the mouse cursor in a prescribed area, such as outside of the hotspot 150. This is especially beneficial when one has had to log into a session and does not want to have to close out and log back in again.

Figure 3:
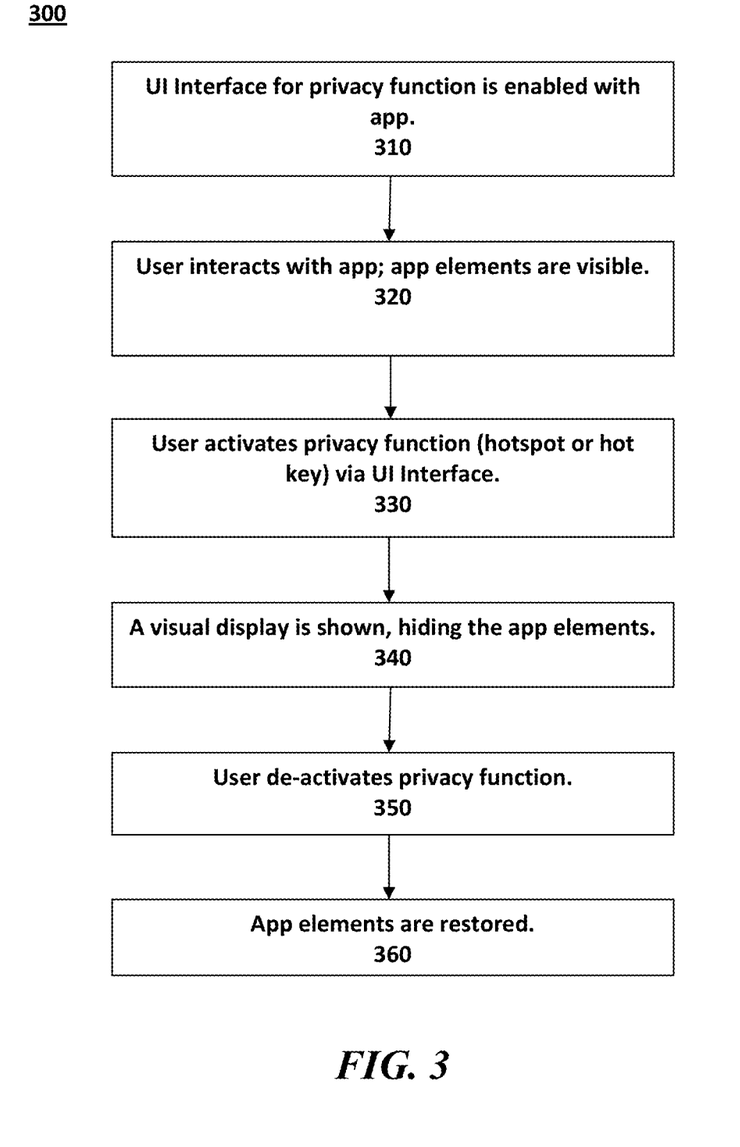
FIG. 3 is a high-level flowchart of the method for providing a privacy feature for e-mails, according to an embodiment of the present disclosure.

Referring now to FIG. 3, there is shown a high-level flowchart of the method for app privacy, according to an embodiment of the present disclosure. We begin at step 310 by enabling the UI 150 for the privacy feature. The UI 150 can be presented to the user in the form of a hotspot as shown in FIG. 1 or as a hotkey that invokes the privacy feature. In step 320 the user interacts with the Web-based application (e-mail, social media, mobile messaging app, on-line shopping site, and the like); therefore the user is not in privacy mode. In this mode, the user's app screen is visible to passersby. The app screen will show the content of whatever app is active, against a backdrop.

In step 330 the user activates the privacy function via the UI 150 by engaging the hotspot 150 or depressing a hotkey. This action triggers the obscuring of the screen elements in the browser app, which is now hidden by a visual display 210, as shown in FIG. 2. FIG. 2 shows that the visual display 210 is the original backdrop, but other images are contemplated within the spirit and scope of the disclosure.

When the user wishes to de-activate the privacy feature in step 350, the original app screen 100 is restored in step 360. Restoring the app screen 100 can be executed in multiple ways, such as: 1) removing an overlay placed over visible elements; and 2) restoring the visible elements to visibility by restoring browser styles CSS settings for opacity and display.

Figure 4:
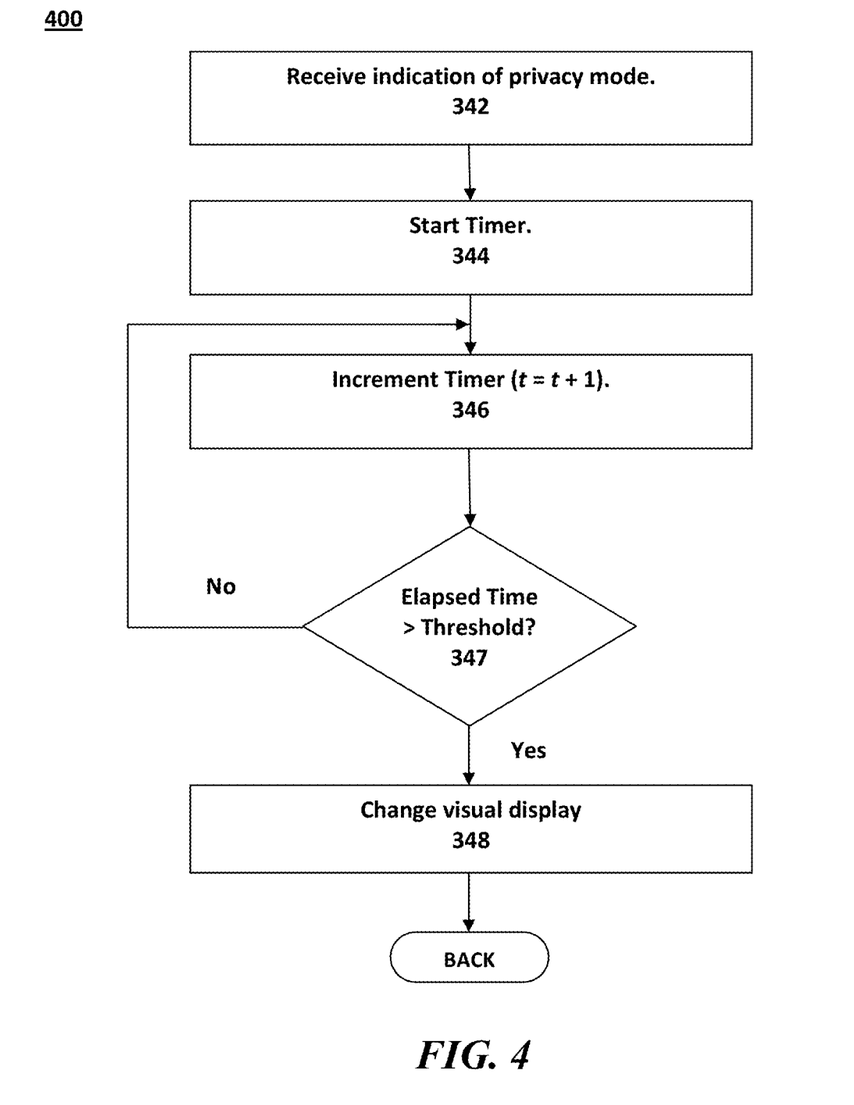
FIG. 4 is a lower-level flowchart of the method for presenting an alternate display, according to an embodiment of the present disclosure.

Referring now to FIG. 4, we show a lower-level flowchart 400 of step 340 of FIG. 3, presenting the visual display. Since the privacy feature is automated, once the signal is received that privacy mode has been activated in step 342, a timer is started in step 344. In step 346 the timer is incremented (t=t+1) to track the elapsed time t. In decision step 347 a simple calculation determines if the elapsed time t is greater than a pre-established threshold of time $t_{th}$. If it is determined that the elapsed time t is greater than $t_{th}$, then in step 348 the visual display is changed to show an alternate display, such as the chart 500 of FIG. 5.

Figure 5:
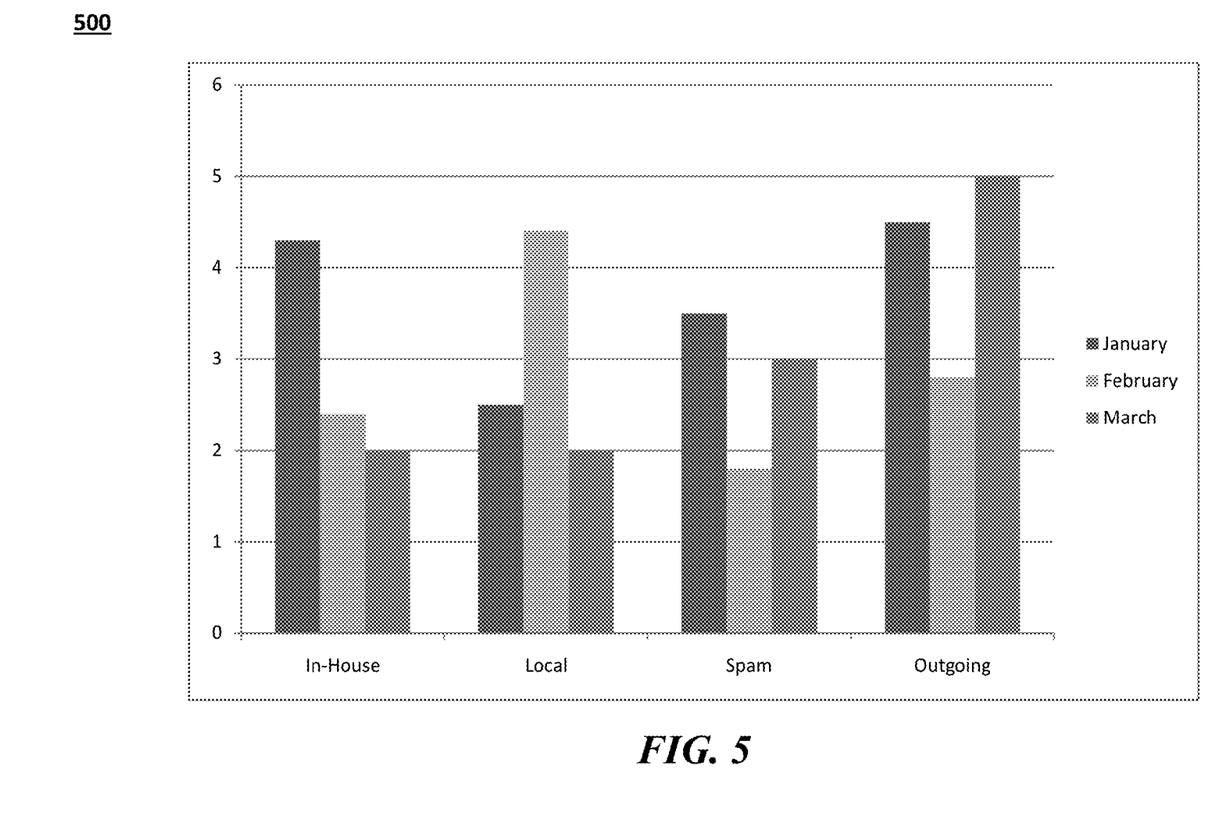
FIG. 5 shows an exemplary illustration of an alternate visual display, according to an embodiment of the present disclosure.

Depending on the amount of time the user is in privacy mode, other UI elements may be introduced, such as the activity graph of FIG. 5 or other engaging imagery. The reason for this is to provide a more engaging display for the user, as well as to discourage any passersby from violating the user's privacy. The alternate display 500 can be one image or a slideshow of images that cycle through and repeat.

Figure 6:
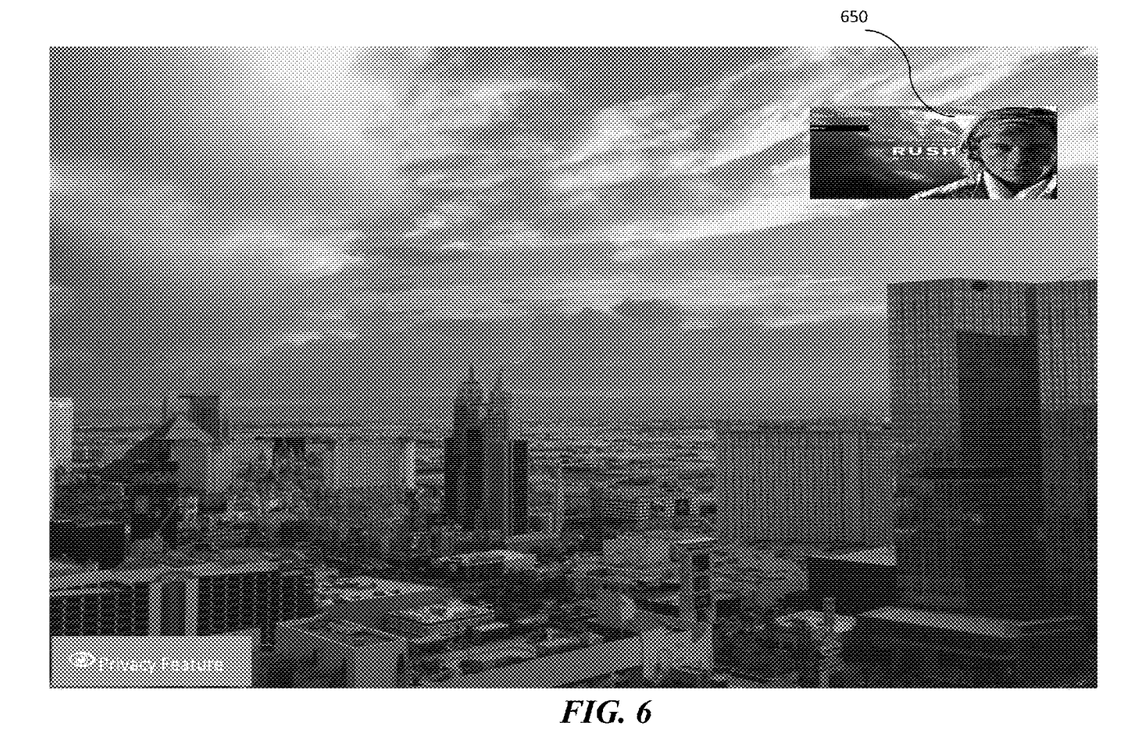
FIG. 6 shows an exemplary illustration of the visual display of FIG. 2, with the addition of an advertisement, according to an embodiment of the present disclosure.

Referring now to FIG. 6, for monetization purposes, we can present a full-screen or partial-screen advertisement or movie trailer if the user has been in the privacy function for a certain amount of time (over the threshold amount $t_{th}$). Advertisements may be served in the visual display based on duration as well, either when in privacy mode, or after the user has escaped from privacy mode.

Figure 8:
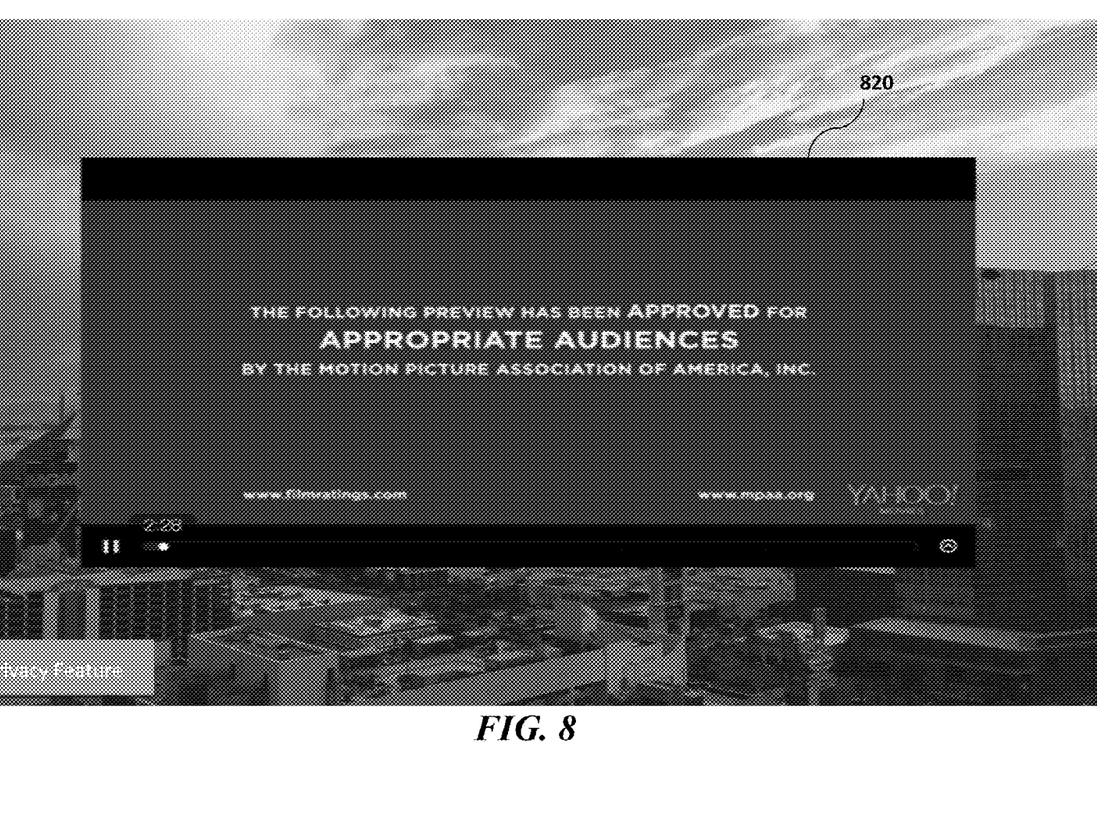
FIG. 8 shows an exemplary illustration of the privacy feature invoked with a movie trailer overlay, according to an embodiment of the present disclosure.
Figure 9:
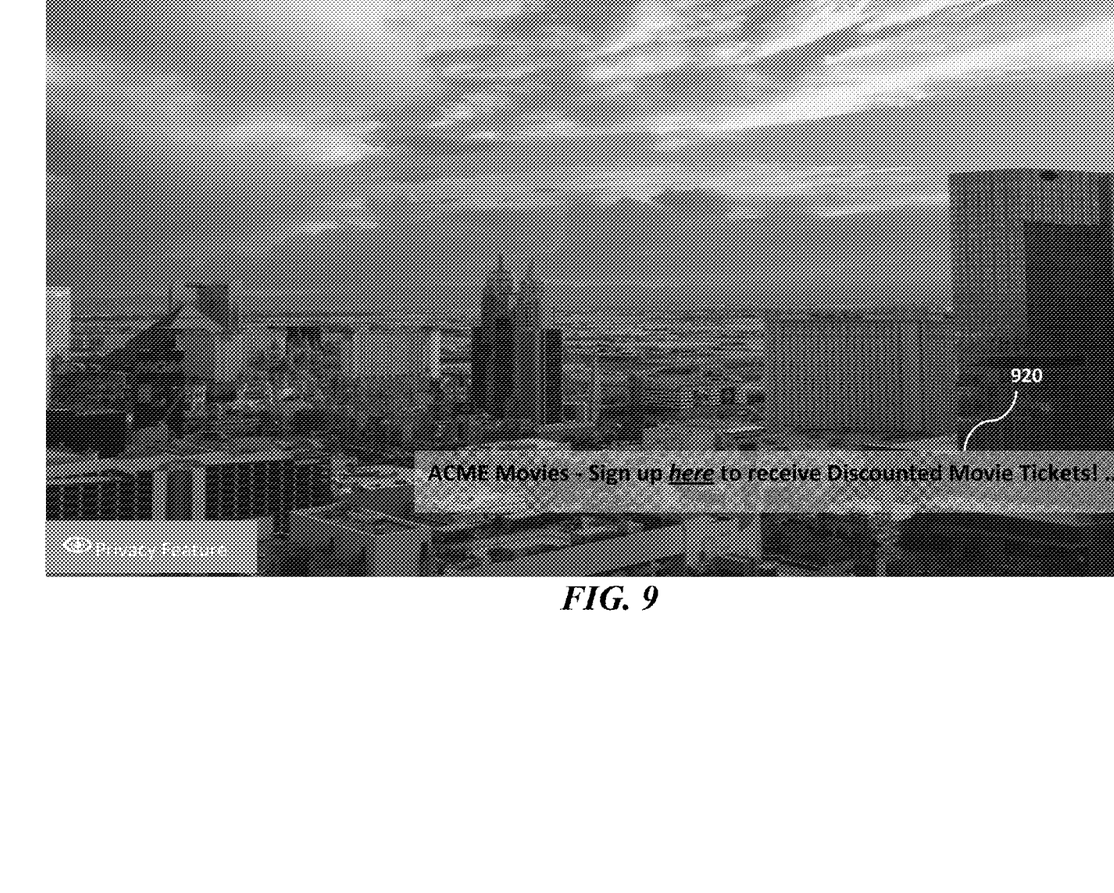
FIG. 9 shows an exemplary illustration of the privacy feature invoked with a text ad overlay, according to an embodiment of the present disclosure.
Figure 10:
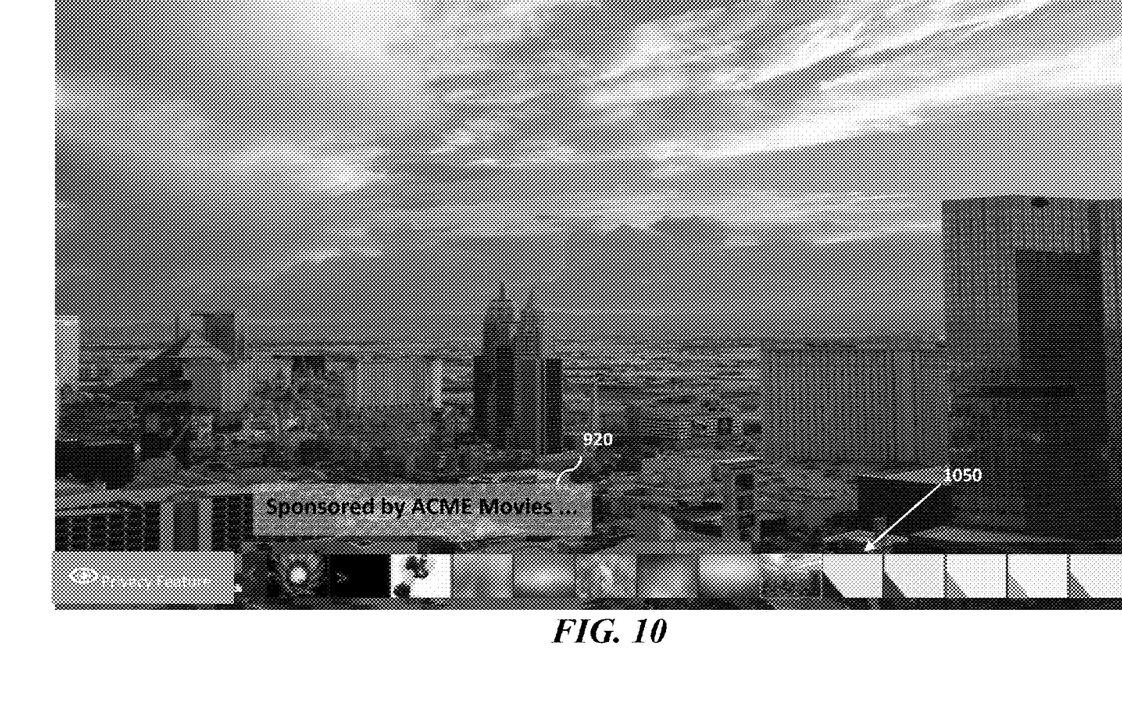
FIG. 10 shows an exemplary illustration of the privacy feature invoked with a theme picker overlay and a text ad, according to an embodiment of the present disclosure.

FIG. 8 shows an exemplary illustration of the privacy feature invoked with a movie trailer overlay 820, according to an embodiment of the present disclosure. FIG. 9 shows an exemplary illustration of the privacy feature invoked with a text ad overlay 920, according to an embodiment of the present disclosure. FIG. 10 shows an exemplary illustration of the privacy feature invoked with a theme picker overlay 1050 and a text ad 920, according to an embodiment of the present disclosure. The theme picker overlay 1050 appears as a toolbar that presents different thumbnail images of visual displays from which to select. The user can select the visual image of choice by clicking on the desired thumbnail image.

Figure 11:
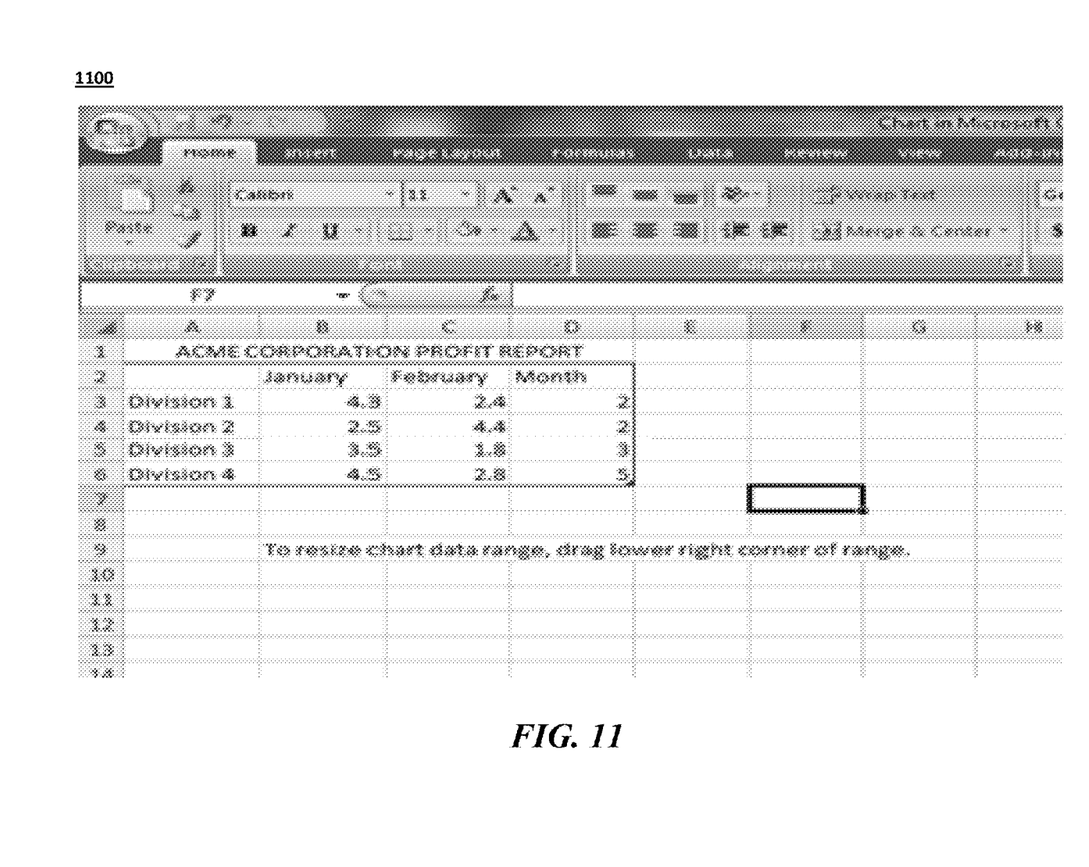
FIG. 11 shows an exemplary spreadsheet application in which the privacy feature can be implemented, according to an embodiment of the present disclosure.
Figure 12:
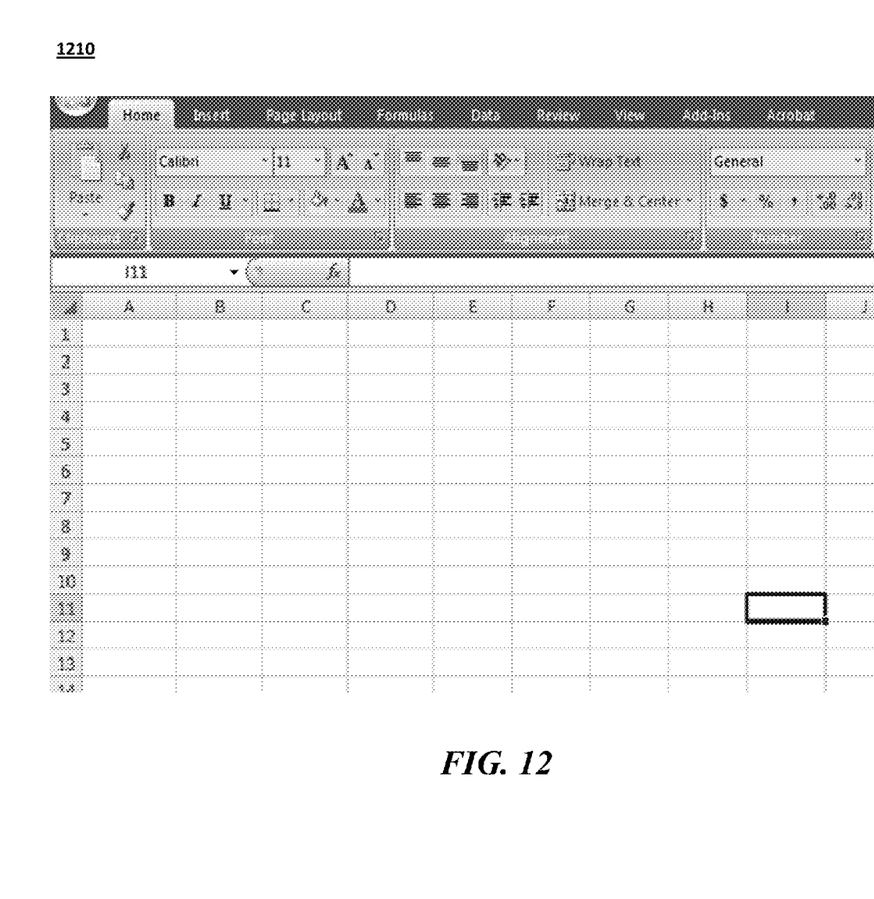
FIG. 12 shows an exemplary visual display using the same background as the application of FIG. 11, according to an embodiment of the present disclosure.

FIG. 11 shows an exemplary spreadsheet application that supports the privacy feature according to the disclosure. In this embodiment, we assume the user is engaging with the spreadsheet. It will be noted that no UI 150 such as the one shown in previous FIGS. is visible in this application. Instead, the user depresses a hotkey to invoke the privacy feature. Once invoked, the privacy feature hides the screen elements entered by the user, leaving the spreadsheet backdrop. This is shown in FIG. 12 where the privacy screen 1210 has the same "look and feel" as the original application that the user wishes to hide. This is done by using the same backdrop as the hosting application.

There are many benefits and advantages of the privacy feature as disclosed. Some of these include:
 1) Provide privacy by instantly hiding private applications from passersby;
 2) Discourage passersby from taking an interest in the user's session;
 3) Reveal a photo wallpaper that is interesting to the user; and
 4) Transition into monetizing features such as advertisements, whether static or video.

Figure 7:
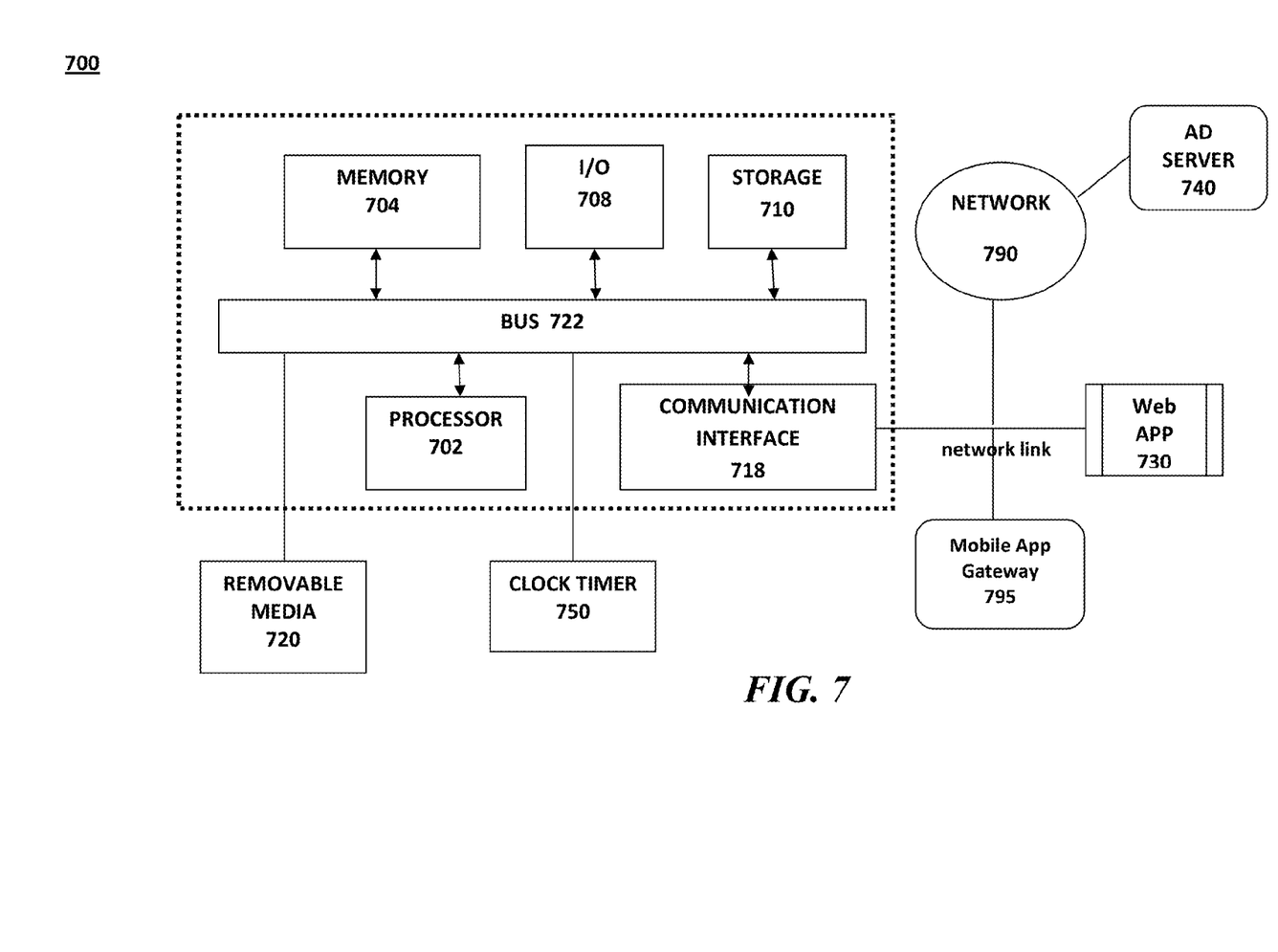
FIG. 7 is high level block diagram showing an information processing system configured to operate according to an embodiment of the present disclosure.

FIG. 7 Hardware Embodiment.

Referring now to FIG. 7, there is provided a simplified pictorial illustration of an information processing system including the hardware components for providing e-mail privacy, in which the present invention may be implemented. For purposes of this invention, computer system 700 may represent any type of computer, information processing system or other programmable electronic device, including a client computer, a server computer, a portable computer, a tablet computer, an embedded controller, a personal digital assistant, a mobile device, and so on. The computer system 700 may be a stand-alone device or networked into a larger system.

Computer system 700, illustrated for exemplary purposes as a networked computing device, is in communication with other networked computing devices (such as Web App 730 and an Ad Server 740) via network 790. For mobile device applications, computer system 700 is in communication with Mobile App Gateway 795. As will be appreciated by those of ordinary skill in the art, network 790 may be embodied using conventional networking technologies and may include one or more of the following: local area networks, wide area networks, intranets, Cloud computing, public Internet and the like.

Throughout the description herein, an embodiment of the invention is illustrated with aspects of the invention embodied solely on computer system 700. As will be appreciated by those of ordinary skill in the art, aspects of the invention may be distributed amongst one or more networked computing devices which interact with computer system 700 via one or more data networks such as, for example, network 790. However, for ease of understanding, aspects of the invention have been embodied in a single computing device—computer system 700.

Computer system 700 includes, inter alia processing device 702 which communicates with an input/output subsystem 708, memory 704, storage 710 and network 790. The processor device 702 is operably coupled with a communication infrastructure 722 (e.g., a communications bus, crossover bar, or network). The processor device 702 may be a general or special purpose microprocessor operating under control of computer program instructions executed from memory 704 on program data. The processor 702 may include a number of special purpose sub-processors such as a comparator engine, each sub-processor for executing particular portions of the computer program instructions. Each sub-processor may be a separate circuit able to operate substantially in parallel with the other sub-processors.

The memory 704 may be partitioned or otherwise mapped to reflect the boundaries of the various memory subcomponents. Memory 704 may include both volatile and persistent memory for the storage of: operational instructions for execution by CPU 702, data registers, application storage and the like. Memory 704 preferably includes a combination of random access memory (RAM), read only memory (ROM) and persistent memory such as that provided by a hard disk drive or other tangible device. The computer instructions/applications that are stored in memory 704 are executed by processor 702.

Those skilled in the art will appreciate that the functionality implemented within the blocks illustrated in the diagram may be implemented as separate components or the functionality of several or all of the blocks may be implemented within a single component. For example, the functionality for the Clock Timer 750 may be included in the same component as the Processor Device 702.

The I/O subsystem 708 may include various end user interfaces such as a display, a keyboard, and a mouse. The I/O subsystem 708 may further include a connection to a network 790 such as a local-area network (LAN) or wide-area network (WAN) such as the Internet.

The computer system 700 may also include a removable storage drive 710, representing a floppy disk drive, a magnetic tape drive, an optical disk drive, etc. The removable storage drive 710 reads from and/or writes to a removable storage unit in a manner well known to those having ordinary skill in the art. Removable storage unit, represents a floppy disk, a compact disc, magnetic tape, optical disk, CD-ROM, DVD-ROM, and the like which are read by and written to by removable storage drive 710. As will be appreciated, the removable storage unit 710 includes a non-transitory computer readable medium having stored therein computer software and/or data.

The computer system 700 may also include a communications interface 718. Communications interface 718 allows software and data to be transferred between the computer system and external devices. Examples of communications interface 718 may include a modem, a network interface (such as an Ethernet card), a communications port, a PCM-CIA slot and card, etc.

In this document, the terms "computer program medium," "computer usable medium," and "computer readable medium" are used to generally refer to non-transitory media such as removable storage drive 710, or a hard disk drive. These computer program products are means for providing computer-executable instructions to the computer system 700. The computer readable medium 710 allows the computer system 700 to read data, instructions, messages or message packets, and other computer readable information from the computer readable medium 710.

Therefore, while there has been described what is presently considered to be the preferred embodiment, it will understood by those skilled in the art that other modifications can be made within the spirit of the invention. The above descriptions of embodiments are not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiments described above, but rather should be interpreted within the full meaning and scope of the appended claims.

We claim:

1. A method for assuring privacy of a web browser-based application, the method comprising:
   accessing, via a web browser, a web document from a website corresponding to the web browser-based application,
      wherein the web browser-based application comprises one of an e-mail application, a social media application, a messaging application, an on-line shopping application or a spreadsheet application;
   generating a user interface coupled with the web browser-based application,
      wherein the user interface comprises a privacy feature,
      wherein the web browser-based application displays, based upon the web document, interactive application-based screen elements of the web browser-based application against a static backdrop of the web browser-based application on a screen associated with a device at a first time,
      wherein the static backdrop is displayed as part of a presentation of the web browser-based application and at least some of the static backdrop of the web browser-based application is displayed within a window of the web browser-based application;
   receiving a first command, through the user interface, to activate the privacy feature,
      wherein the first command is received at a second time from a user of the device while the user is interacting with the web browser-based application, the second time after the first time;
   activating the privacy feature,
      wherein the activating comprises presenting a visual display hiding the interactive application-based screen elements of the web browser-based application from view at a third time while keeping at least some of the static backdrop of the web browser-based application within view at the third time, responsive to receiving the first command,
      wherein the web browser-based application remains open and at least partially displayed upon the activating, the third time after the second time,
      wherein the hiding comprises making one or more visible elements invisible by at least one of placing an overlay over at least some of the interactive application-based screen elements or applying style sheet settings to at least some of the interactive application-based screen elements;
   receiving a second command, through the user interface, to de-activate the privacy feature,
      wherein the second command is received at a fourth time, the fourth time after the third time; and restoring the interactive application-based screen elements to full view at a fifth time, responsive to receiving the second command, the fifth time after the fourth time.

2. The method of claim 1, wherein generating the user interface comprises:
Generating a hotspot on the web browser-based application.

3. The method of claim 1, wherein the web browser-based application comprises the e-mail application.

4. The method of claim 1, wherein the web browser-based application comprises the social media application.

5. The method of claim 1, wherein the web browser-based application comprises the messaging application.

6. The method of claim 1, wherein the web browser-based application comprises the on-line shopping application.

7. The method of claim 1, wherein the web browser-based application comprises the spreadsheet application.

8. The method of claim 1, comprising serving an advertisement along with the visual display.

9. The method of claim 1, wherein the static backdrop of the web browser-based application is a static application backdrop corresponding to the web browser-based application and not corresponding to one or more other applications on the device.

10. An information processing system for a web browser-based application, the information processing system comprising:
a processor device executing computer-executable instructions; and
a memory operably coupled with the processor device, and storing the computer-executable instructions comprising:
accessing, via a web browser, a web document from a website corresponding to the web browser-based application;
generating a user interface coupled with the web browser-based application,
wherein the user interface comprises a privacy feature,
wherein the web browser-based application displays, based upon the web document, interactive application-based screen elements of the web browser-based application against a static backdrop of the web browser-based application on a screen associated with a device,
wherein the static backdrop of the web browser-based application is a static application backdrop displayed as part of a presentation of the web browser-based application and at least some of the static backdrop of the web browser-based application is displayed within a window of the web browser-based application;
receiving a first command, through the user interface, to activate the privacy feature,
wherein the first command is received from a user of the device while the user is interacting with the web browser-based application;
activating the privacy feature,
wherein the activating comprises presenting a visual display hiding the interactive application-based screen elements of the web browser-based application from view while keeping at least some of the static backdrop of the web browser-based application within view, responsive to receiving the first command,
wherein the web browser-based application remains open and at least partially displayed upon the activating,
wherein the hiding comprises making one or more visible elements invisible by at least one of placing an overlay over at least some of the interactive application-based screen elements or applying style sheet settings to at least some of the interactive application-based screen elements;
receiving a second command, through the user interface to de-activate the privacy feature; and
restoring the interactive application-based screen elements to full view, responsive to receiving the second command.

11. The information processing system of claim 10, wherein:
The user interface comprises a hotspot; and
Wherein receiving the first command comprises receiving an indication that the user has performed at least one of moving a pointing device over the hotspot, clicking on the hotspot, touching the hotspot, shaking the device or performing a gesture over the hotspot.

12. The information processing system of claim 10, wherein the user interface comprises a hotkey.

13. The information processing system of claim 10, wherein the computer-executable instructions comprise:
Starting a timer function;
Determining if elapsed time in privacy mode is greater than a threshold amount of tine; and
Changing the visual display to an alternate visual display when it is determined that the elapsed time in privacy mode is greater than the threshold amount of time.

14. The information processing system of claim 10, wherein the user interface comprises:
A plurality of graphical images available for selection as the visual display.

15. The information processing system of claim 11, wherein receiving the second command comprises at least one of moving the pointing device away from the hotspot, moving the pointing device over the hotspot, clicking on the hotspot, touching the hotspot or performing a gesture over the hotspot.

16. The information processing system of claim 10, wherein the computer-executable instructions comprise:
Serving an advertisement along with the visual display.

17. The information processing system of claim 10, the web browser-based application comprising one of an e-mail application, a social media application, a messaging application, an on-line shopping application or a spreadsheet application.

18. A computer program product comprising a non-transitory computer readable storage medium with computer-executable instructions stored thereon, the computer-executable instructions, when activated, causing a computer to perform:
generating a user interface coupled with an application comprising interactive application-based screen elements and a static backdrop,
wherein the user interface comprises a privacy feature,
wherein the application displays the interactive application-based screen elements of the application against the static backdrop of the application on a screen associated with a device,
wherein the static backdrop is displayed as part of a presentation of the application and at least some of the static backdrop of the application is displayed within a window of the application, wherein the application is associated with a website;
receiving a first command, through the user interface, to activate the privacy feature,
  wherein the first command is received from a user of the device;
activating the privacy feature,
  wherein the activating comprises presenting a visual display hiding the interactive application-based screen elements of the application associated with the website from view while keeping at least some of the static backdrop of the application associated with the website within view, responsive to receiving the first command,
  wherein the application remains open and at least partially displayed upon the activating,
  wherein the hiding comprises making one or more visible elements invisible by at least one of placing an overlay over at least some of the interactive application-based screen elements or applying style sheet settings to at least some of the interactive application-based screen elements;
receiving a second command, through the user interface, to de-activate the privacy feature; and
restoring the interactive application-based screen elements to full view, responsive to receiving the second command.

19. The computer program product of claim 18, wherein the computer-executable instructions cause the computer to perform:
  Starting a timer function;
  Determining if elapsed time in privacy mode is greater than a threshold amount of time; and
  Changing the visual display to an alternate visual display when it is determined that the elapsed time in privacy mode is greater than the threshold amount of time.

20. The computer program product of claim 18, wherein the computer-executable instructions cause the computer to perform:
  Presenting a plurality of graphical images available for selection as the visual display;
  Receiving a selection of one of the plurality of the graphical images; and
  Implementing the one of the plurality of the graphical images as the visual display.

* * * * *